Jan. 19, 1960 D. L. McKAY 2,921,593
REMOVAL OF REACTANT MATERIALS FROM A PRESSURE VESSEL
Filed May 8, 1957 3 Sheets-Sheet 1

INVENTOR.
D.L. MC KAY
BY Hudson & Young
ATTORNEYS

Jan. 19, 1960     D. L. McKAY     2,921,593
REMOVAL OF REACTANT MATERIALS FROM A PRESSURE VESSEL

INVENTOR.
D. L. MC KAY
BY Hudson and Young
ATTORNEYS

Jan. 19, 1960     D. L. McKAY     2,921,593
REMOVAL OF REACTANT MATERIALS FROM A PRESSURE VESSEL
Filed May 8, 1957     3 Sheets-Sheet 3

INVENTOR.
D. L. McKAY
BY
ATTORNEYS

United States Patent Office 2,921,593
Patented Jan. 19, 1960

2,921,593

REMOVAL OF REACTANT MATERIALS FROM A PRESSURE VESSEL

Dwight L. McKay, Bartlesville, Okla., assignor to Phillips Petroleum Company, a corporation of Delaware Application May 8, 1957, Serial No. 657,963

14 Claims. (Cl. 137—14)

This invention relates to the removal of a slurry of solids in a liquid from a pressure vessel. In one aspect, the invention relates to apparatus for effecting the removal from a reaction zone of a slurry of solids in a liquid medium. In another aspect, it relates to a method for controlling the removal of a slurry of solids in a liquid from a pressurized reaction zone.

It has recently been discovered, as disclosed in the U.S. patent application of J. P. Hogan and R. L. Banks, Serial No. 476,306, filed December 20, 1954, now abandoned, that unique polymers and copolymers can be produced by contacting one or more olefins with a catalyst comprising, as an essential ingredient chromium oxide, preferably including a substantial amount of hexavalent chromium. The chromium oxide is ordinarily associated with at least one other oxide, particularly at least one oxide selected from the group consisting of silica, alumina, zirconia, and thoria. The olefin feed used for the polymerization is at least one olefin selected from a class of 1-olefins having a maximum of 8 carbon atoms per molecule and no branching nearer the double bond than the 4-position. Examples of olefins which can be polymerized by the described method include ethylene, propylene, 1-butene, 1-pentene, and 1,3-butadiene. Copolymers, such as ethylene-propylene copolymers, and ethylene-butadiene copolymers, can also be prepared by utilizing the chromium oxide-containing catalyst. In the copending U.S. patent application Serial No. 590,567, filed by G. T. Leatherman and C. V. Detter on June 11, 1956, there is described an improvement in the process disclosed in the Hogan and Banks application insofar as the production of ethylene polymers is concerned.

In accordance with the Leatherman and Detter process, which is described in detail in the above-cited application, ethylene or mixtures of ethylene with other unsaturated hydrocarbons are contacted with a suspension of a chromium oxide-containing catalyst in a liquid hydrocarbon diluent. The contacting occurs at a temperature such that substantially all of the polymer produced is insoluble in the diluent and in solid particle form, the particles being substantially non-tacky and non-agglutinative, and suspended in the liquid diluent. The liquid hydrocarbon diluent serves as an inert dispersant and heat transfer medium in the practice of the process. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule can be advantageously utilized in the practice of the invention. Examples of paraffins which can be used include propane, n-butane, n-pentane, isopentane, n-hexane, n-decane, 2,2,4-trimethylpentane (isooctane), and the like. Another class of hydrocarbons which can be used are naphthenic hydrocarbons having from 4 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. A preferred subclass of naphthenic hydrocarbons within the above-described general class is constituted by those naphthenic hydrocarbons having from 5 to 6 carbon atoms in a single ring and from 0 to 2 methyl groups as the only substituents on the ring. Thus, the preferred naphthenic hydrocarbons are cyclopentane, cyclohexane, methylcyclopentane, methylcyclohexane, the dimethylcyclopentanes, and the dimethylcyclohexanes. It is also disclosed that mixtures of paraffinic and naphthenic hydrocarbons can be used as the reaction medium.

When utilizing butane and higher paraffinic hydrocarbons as the reaction medium, the polymerization temperature of the Leatherman and Detter process is generally in the range of about 230° F. and below, preferably 225° F. and below. Propane having a critical temperature of about 206° F. is useful in the range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit will be between 190 and 230° F., depending upon the composition of the mixture.

One modification of the Leatherman and Detter process comprises contacting ethylene in a reaction zone with a suspension of a chromium oxide-containing catalyst in a liquid hydrocarbon selected from the group consisting of paraffinic and naphthenic hydrocarbons, the contacting occurring at a temperature in the range of 150 to 230° F. when said liquid hydrocarbon is a paraffin, and at a temperature in the range of 150 to 190° F. when said liquid hydrocarbon is a naphthenic hydrocarbon; removing a mixture of liquid hydrocarbon and polymer from the reaction zone; and separating polymer from the mixture. More desirably, the polymerization is carried out at a temperature in the range of 150 to 225° F. when the liquid hydrocarbon is a paraffin and in the range of 150 to 180° F. in the case of cycloparaffins. One of the important advantages of the invention lies in the fact that it is unnecessary to treat the polymer to remove the catalyst. However, where desired, the polymer can be treated so as to separate catalyst from the polymer.

The catalyst utilized in the above-described process comprises as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. The chromium oxide content of the catalyst can range from 0.1 to 10 or more weight percent, e.g., up to about 50 percent or higher, usually 50 percent or less, but the preferred range is from 2 to 6 weight percent, expressed as elemental chromium. A preferred non-chromium component is a silica-alumina composite containing a major proportion of silica and a minor proportion of alumina. While the method for preparing the silica-alumina composite undoubtedly effects to some extent the catalyst activity, it appears that composites prepared by any of the prior art processes for preparing such catalytically active composites, e.g., co-precipitation or impregnation, are operative for the process of this invention. Methods for the preparation and activation of this catalyst are described in detail in the Hogan and Banks application referred to hereinbefore. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., under non-reducing conditions, for example, with a stream of substantially anhydrous (dew point preferably 0° F. or lower) oxygen-containing gas, such as air. A commercial micro-spheroidal silica-alumina composite can also be advantageously used in the preparation of the catalyst.

The catalyst is preferably employed in the form of a relatively fine powder so that it may be readily maintained in suspension or as a slurry in the liquid hydrocarbon. The catalyst powder generally has a particle size of 30 mesh and smaller, preferably 50 mesh and smaller. While the catalyst size is not critical, it should be small enough so that it can be readily maintained as a slurry in the liquid hydrocarbon. The concentration of the catalyst in the reaction zone can vary within wide limits. However, the concentration of the catalyst in the reaction zone will generally be in the range of 0.01 to 5 weight percent, preferably 0.5 to 1.0 weight percent, based upon the total amount of the reaction medium, i.e., liquid hydrocarbon diluent, present in the reaction zone. While there are no critical residence or contact times for practicing the process, the contact time will generally be in the range of 0.1 to 12 hours, preferably from 1 to 5 hours.

When practicing the Leatherman and Detter process, the pressure in the reaction zone is generally that sufficient to maintain the liquid hydrocarbon diluent in the liquid phase and will ordinarily range from about 100 to about 700 p.s.i. For efficient, continuous operation of the process, it is necessary to provide means for the removal of the reaction mixture from the reaction zone while still maintaining a desired pressure therein. Because the reaction mixture comprises a slurry of solid polymer particles in the liquid hydrocarbon diluent, a conventional ported-type motor valve cannot be effectively used to control the withdrawal of the reaction mixture. It has been found that if such a conventional valve is used, it has only a very short valve life because of the erosive nature of the slurry of polymer particles in the reaction medium.

It is, therefore, an object of this invention to provide an improved means for removing a slurry of solids in a liquid from a pressure vessel.

Another object of the invention is to provide means for controlling the rate of withdrawal of a slurry of solids in a liquid from a pressure reactor.

Still another object of the invention is to provide a method for controlling the rate at which a slurry of solids in a liquid is withdrawn from a pressurized reaction zone.

A further object of the invention is to provide means for withdrawing a slurry of solids in a liquid from a pressurized vessel while maintaining a desired pressure within the vessel.

A still further object of the invention is to provide an improved method for conducting a polymerization process in which substantially all of the polymer produced is in solid particle form suspended in a liquid reaction medium.

Other and further objects and advantages of the invention will become apparent to one skilled in the art upon consideration of the accompanying disclosure.

The instant invention resides in an improved apparatus and method whereby a slurry of solids in a liquid material is withdrawn from a pressure vessel at a desired rate while maintaining a desired pressure within the vessel. Broadly speaking, the apparatus of this invention comprises a pressure vessel having inlet and outlet conduit means attached thereto, at least two flow control means, such as full opening valve means, positioned in the outlet conduit means, and means attached to each of the flow control means for sequentially opening and closing same at a desired time and rate. In another embodiment, in a process carried out in a closed reaction zone under pressure, the invention resides in an improvement in the method for continuously withdrawing from the reaction zone reactant materials comprising solids in a liquid medium. The improvement broadly comprises the following steps: passing the reactant materials from the reaction zone into a pressure reduction zone, the pressure therein being initially approximately equal to the pressure within the reaction zone, increasing, e.g., at least one time, the volume of the pressure reduction zone while terminating communication between said zone and said reaction zone, thereby decreasing the pressure within the pressure reduction zone, and withdrawing the reactant materials from the pressure reduction zone at a predetermined pressure which is less than that maintained in the reaction zone. In still another embodiment of the invention, in a polymerization process, the rate at which the reactant materials are passed into the pressure reduction zone and withdrawn therefrom is controlled in accordance with one of the variables liquid level and pressure within the reaction zone.

A more complete understanding of the invention can be obtained by referring to the accompanying drawing, in which.

While the invention will be discussed with relation to a polymerization process in which ethylene is polymerized in the presence of a chromium oxide-containing catalyst using normal pentane as the reaction medium or diluent, it is to be understood that it is not intended to limit the invention to polymerization processes. Although the invention is particularly applicable to such a process, it can also be advantageously used in conjunction with other processes wherein it is desired to remove a fluid material containing solids from a pressurized vessel.

Figure 1:
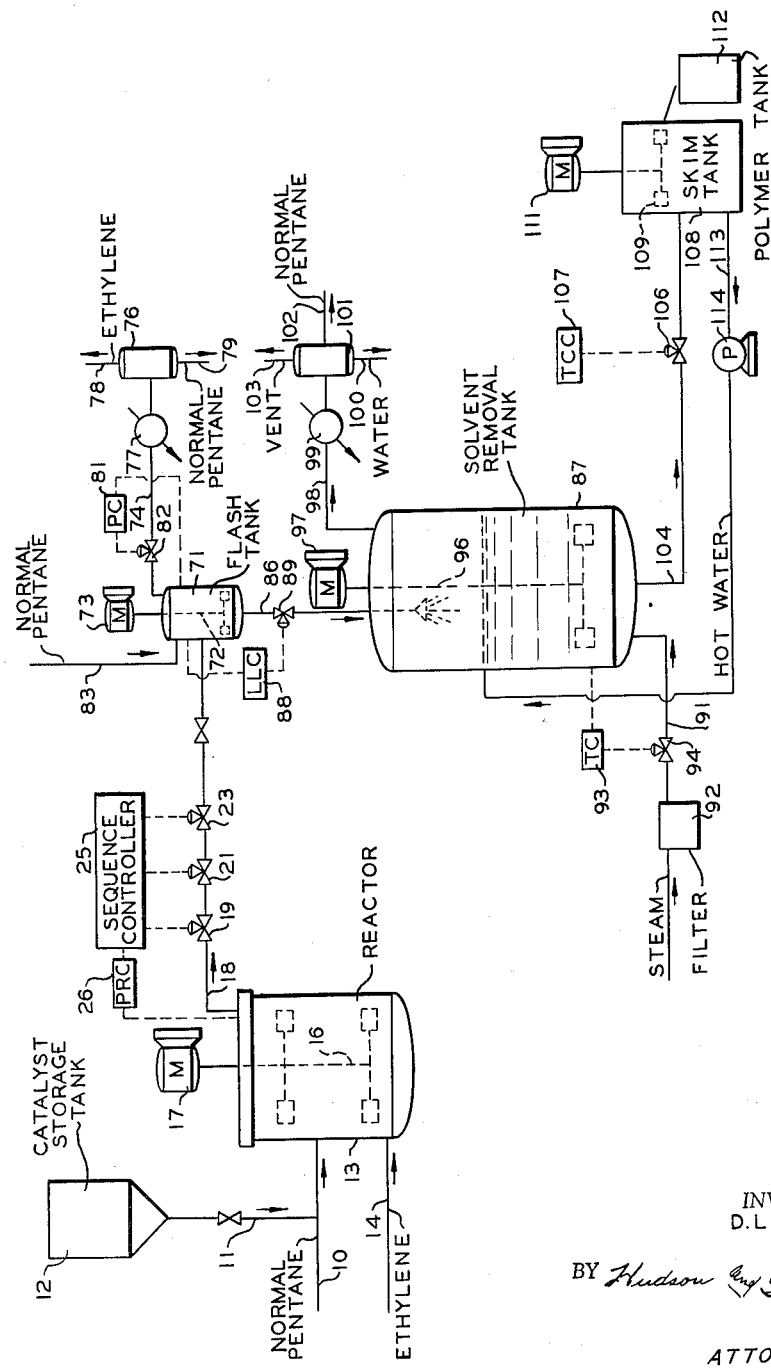
Figure 1 is a flow diagram illustrating one embodiment of the invention.

Referring now to the drawing, as shown in Figure 1, a liquid hydrocarbon, such as normal pentane, enters the system through inlet line 10. A catalyst, which preferably has a particle size of 50 mesh or smaller, is added to the liquid hydrocarbon by means of line 11 connecting catalyst storage tank 12 to line 10. The slurry of catalyst in normal pentane which is thus formed is then pumped into reactor 13. The catalyst can be, for example, a chromium oxide-silica-alumina catalyst prepared by impregnating a 90 weight per cent silica and 10 weight percent alumina gel composite with chromium trioxide, drying, and heating in air to obtain a catalyst composition containing approximately 2.0 weight percent chromium in the form of chromium oxide of which about half is in the form of hexavalent chromium.

Ethylene enters the system through inlet line 14 and is intimately contacted with the catalyst suspension or slurry in reactor 13. It is to be understood that mixtures of ethylene with other unsaturated hydrocarbons, e.g., mixtures of ethylene with minor amounts of higher 1-olefins, such as propylene, 1-butene, 1-pentene, 1-hexene, and the like, can be polymerized in accordance with this process. A suitable stirring means 16, driven by motor 17, is provided to facilitate contacting and to maintain the catalyst in suspension in the reaction medium. The reaction zone is maintained at a temperature such that the polymer produced is substantially insoluble in the normal pentane and is in solid particle form. When utilizing a paraffinic hydrocarbon, such as normal pentane, this temperature is in the range of about 230° F. and below, preferably 225° F. and below. When naphthenic hydrocarbons are employed the temperature is in the range of about 190° F. and below, preferably about 180° F. and below. While there appears to be nothing critical about the lower temperature at which the polymerization can be carried out, as a practical matter, it is desirable in the case of paraffins and cycloparaffins that the temperature not be below 150° F. The pressure in reactor 13 is such that the normal pentane is maintained substantially in the liquid phase. This pressure is generally in the range of 100 to 700 p.s.i.

The reactor effluent which is withdrawn through line 18 comprises a mixture of solid polymer particles containing catalyst, normal pentane, and small amounts of unreacted ethylene. Since the reaction is carried out at a temperature such that the polymer produced is substantially insoluble in the normal pentane, only a small amount of light polymer will be dissolved in the reaction medium.

As discussed hereinbefore, the instant invention in one of its aspects resides in an improved means for withdrawing a slurry of solid material in a liquid medium from a pressurized reactor. It has been found that a conventional ported-type motor valve cannot be utilized to control the withdrawal of this type of material because of the erosive effect of the material on such a valve. In accordance with the instant invention, at least two flow control means, preferably full opening valve means, are positioned in series in the effluent outlet line. Thus, as shown in Figure 1, valves 19, 21 and 23 are disposed in series in conduit 18 connected to reactor 13. The term "full opening valve means" is used herein to designate a valve which is to be operated wide open or fully closed. Plug valves can be advantageously employed as well as ball valves, such as those manufactured by the Jamesbury Corp. of Worcester, Mass. This type of valve is used in the practice of this invention since it offers no constriction to flow when in an open position, thereby eliminating flashing and substantially obviating valve erosion because of the short contact time of the moving valve parts with the flowing materials.

Figure 3:
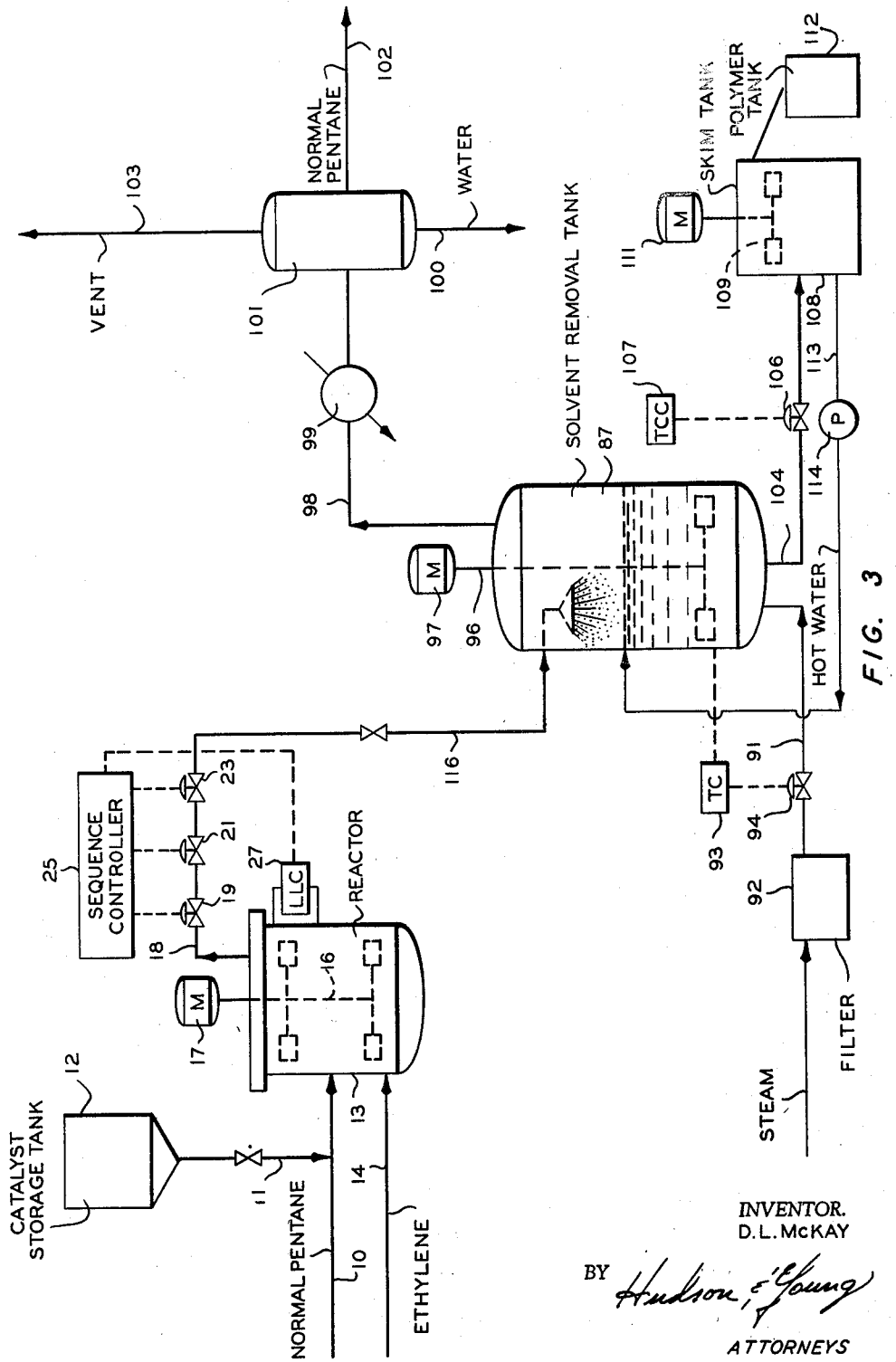
Figure 3 shows an alternate flow and control system for Figure 1.

Valves 19, 21 and 23 are each operatively connected to sequence controller 25 which functions to open and close the valves in a predetermined manner. Pressure recorder-controller 26, which is operatively connected to to reactor 13 and to sequence controller 25 operates to control the rate at which the sequence controller opens and closes valves 19, 21 and 23. It is also within the scope of the invention to employ a liquid level controller 27 to adjust the rate at which the sequence controller opens and closes the three valves in line 18 as shown in Figure 3.

Figure 2:
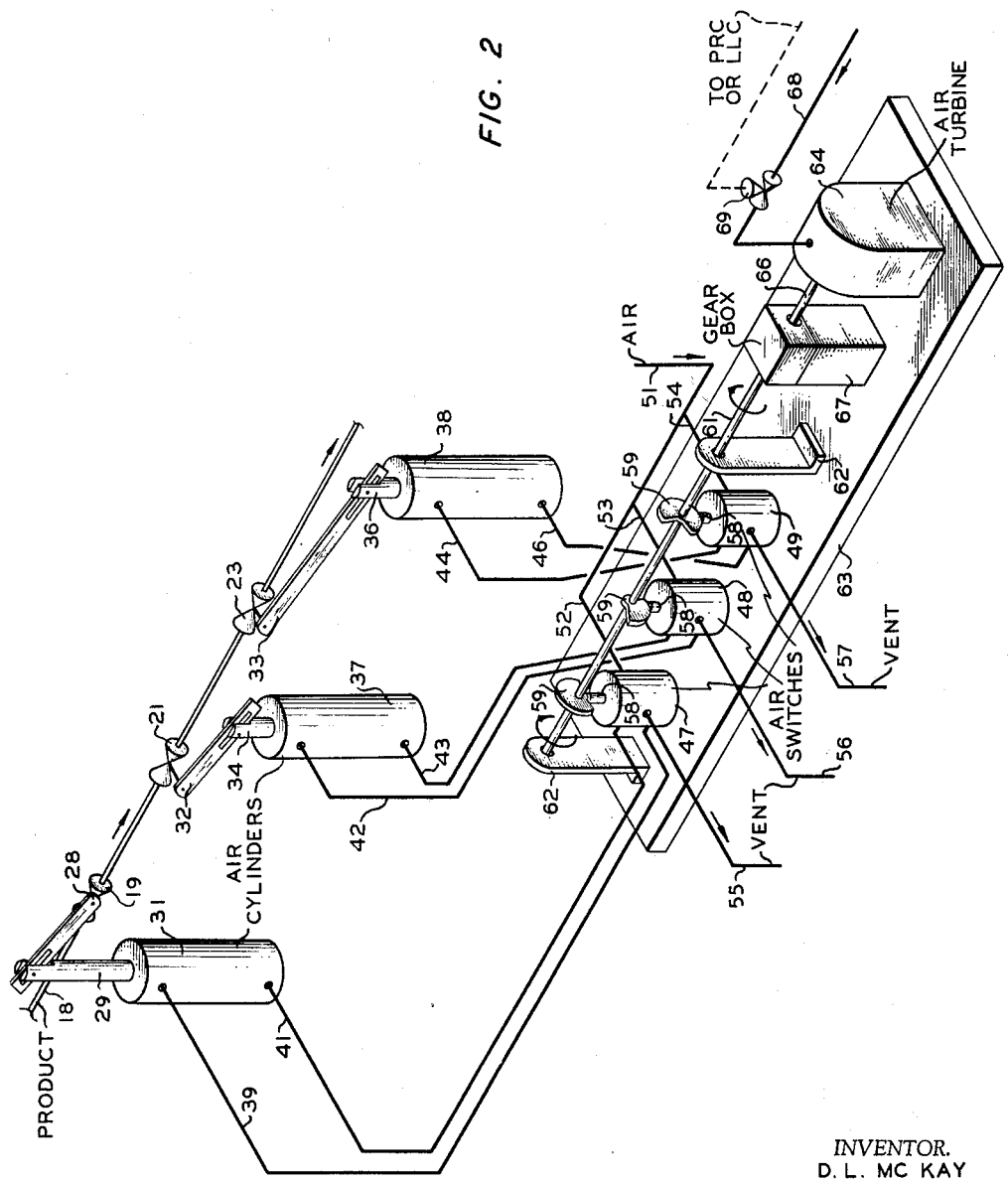
Figure 2 is a diagrammatic representation of the details of a sequence controller suitable for use in the practice of the invention.

A clearer understanding of the function of valves 19, 21 and 23 and the method of their operation can be had by referring to Figure 2. This figure shows diagrammatically the details of apparatus which can be advantageously used to sequentially control the operation of valves 19, 21 and 23. However, it is to be understood that it is not intended to limit the invention to the particular arrangement of apparatus shown in Figure 2, for a commercial sequence controller can be suitably adapted to control the operation of the valves. Identical reference numerals have been used in Figure 2 to designate elements previously described with relation to Figure 1.

As shown in Figure 2, each of the valves 19, 21 and 23 has associated therewith a hydraulic cylinder which functions through a linkage arrangement to open and close its respective valve. Thus, valve 19 is connected by means of linkage 28 to piston rod 29 which has connected at its lower end a piston which rides in cylinder 31. In a like manner, valves 21 and 23 are connected, respectively, by means of linkages 32 and 33 to piston rods 34 and 36 which are connected at their lower ends to pistons contained in cylinders 37 and 38. The upper and lower portions of each of the hydraulic cylinders have lines connected thereto, which provide means for introducing a suitable hydraulic fluid, such as air, into and withdrawing same from the cylinders. Thus, air lines 39 and 41 are connected to cylinder 31 while air lines 42 and 43, and air lines 44 and 46 are connected, respectively, to cylinders 37 and 38. Each set of the air lines associated with each of the cylinders is further connected to an air switch which operates to control the flow of air to and from its respective cylinder. Lines 39 and 41 are connected to air switch 47, while lines 42 and 43 and lines 44 and 46 are connected, respectively, to air switches 48 and 49. Inlet air to the air switches is provided by means of line 51 which is further connected to each of the air switches by means of lines 52, 53, and 54. Lines 55, 56, and 57 connected, respectively, to air switches 47, 48, and 49 provide means for venting air through the switches. From the foregoing description, it is seen that the air switches are four way valves, each of which functions to control the flow of air to and from its respective cylinder. Each of the air switches is provided with a plunger 58, which is spring operated and operates to open and close the ports of the air switches in a manner to be described more in detail hereinafter. Plungers 58 are depressed and allowed to return to their raised position through the operation of cams 59 which are connected to shaft 61. Shaft 61 rotates in support members 62 which, together with the air switches, are supported on base plate 63.

Air turbine 64 provides the means for rotating shaft 61 and cams 59 attached thereto. Thus, shaft 66 attached to the rotor of the air turbine is further connected to shaft 61 through gear box 67. The air turbine and the gear box are shown as being mounted on base plate 63. Since shaft 66 rotates at a relatively high speed, gear box 67 having a gear ratio, for example, of 900 to 1 is provided in order to reduce the speed of rotation of shaft 61. Air required for the operation of the air turbine is supplied through line 68. By controlling the rate at which the air is supplied to the air turbine, it is also possible to control the speed of rotation of shaft 66 and concomitantly the speed of rotation of shaft 61. Line 68 contains a flow control means, such as a motor valve 69, which is operatively connected, as desired, to pressure recorder-controller 26 as shown in Figure 1 or liquid level controller 27 as shown in Figure 3.

In the operation of the apparatus shown in Figure 2, air supplied to air turbine 64 through line 68 operates the air turbine so as to cause rotation of shaft 66 and shaft 61. Since cams 59 are connected to shaft 61, rotation of the shaft also causes the cams to rotate, thereby depressing plungers 58 of the air switches or allowing them to be in a raised position. When the plunger of air switch 47 is in a raised position as shown in the figure, air flows through lines 51 and 52 to air switch 47, leaving the switch through line 41. Air flowing through line 41 then enters the lower portion of cylinder 31, causing the piston therein and piston rod 29 to be moved to their raised positions, which in turn results in linkage 28 moving valve 19 to its open position. Any air in the upper portion of cylinder 31 is removed therefrom through line 39 and is subsequently vented through air switch 47 by means of line 55. Valve 19 remains in an open position so long as the plunger of air switch 47 is in a raised position, thereby permitting air to flow through line 41 into the lower portion of cylinder 31. It is seen that the period during which valve 19 remains open can be controlled merely by altering the shape of cam 59.

Referring now to air switch 48, it is seen that while plunger 58 of air switch 47 is in a raised position, the plunger of air switch 48 is maintained by its associated cam in a depressed position. Furthermore, an examination of air switch 49 indicates that its plunger is also maintained in a depressed position at this time. Accordingly, air passed into air switches 48 and 49 through lines 51, 53, and 54 passes through the air switches and is withdrawn therefrom through line 42 in the case of cylinder 37 and through line 44 in the case of cylinder 38. As a result of introducing air into cylinders 37 and 38 through these two lines, the pistons positioned in the cylinders are moved to their lower positions carrying with them their respective piston rods. Movement of the piston rods results also in the movement of linkages 32 and 33 which, respectively, move valves 21 and 23 to their closed positions. Any air present in the lower portion of cylinders 37 and 38 is withdrawn therefrom through lines 43 and 46 and subsequently vented from air switches 48 and 49 through lines 56 and 57.

Referring now to Figure 1 as well as to Figure 2, it is seen that with valve 19 in an open position, reactant material is permitted to flow into the conduit portion between valves 19 and 21. Further rotation of shaft 61 now causes plunger 58 of air switch 47 to be moved to its depressed position, thereby allowing air to pass into cylinder 31 through line 39. As a result, the piston in cylinder 31 and attached piston rod 29 are moved downwardly, causing linkage 28 to close valve 19. Simultaneously with this course of events, plunger 58 of air switch 48 through the operation of the spring associated with the switch is moved to its raised position. Air now flows through line 43 into the lower portion of cylinder 37, raising the piston therein and its attached piston rod 34 and thereby causing the movement of linkage 32 so as to open valve 21. During this cycle of operation, cam 59 associated with air switch 49, maintains its plunger in a depressed position so that valve 23 remains in a closed position. Because of the opening of valve 21, reactant material present in the conduit portion between valves 19 and 21 is permitted to flow into the conduit portion between valves 21 and 23.

The conduit portions between valves 19 and 23 can be termed a pressure reduction zone, for it is in this part of the apparatus wherein the pressure of the material flowing therein is let down. This pressure reduction is accomplished through the provision of means for increasing the volume of this zone by the sequential opening and closing of the flow control means. The amount that the pressure is let down can be varied by adjusting the relative length of the conduit portions between valves 19 and 21 and valves 21 and 23. Where, as shown in the drawing, these conduit portions are both equal, the pressure is reduced approximately by one-half when valve 19 is closed and valve 21 is opened. It is seen that if the conduit portion between valves 21 and 23 has a volume, for example, two times that of the volume of the conduit portion between valves 19 and 21, the pressure will be reduced approximately two-thirds when valve 19 is closed and valve 21 is opened.

After the above-described sequence of events, i.e., the closing of valve 19 and the opening of valve 21 with valve 23 remaining closed, further rotation of shaft 61 results in cam 59 associated with air switch 49 being moved to a position such that plunger 58 is free to move upwardly through the action of the air switch spring. Air can now flow through line 46 into the lower portion of cylinder 38, raising piston rod 36 and through movement of linkage 33 opening valve 23. During this cycle of operation, cams 59 associated with valves 47 and 48 maintain their plungers in a depressed position so that valves 19 and 21 are in a closed position. Because of the opening of valve 23, reactant material now flows through the valve for ultimate passage to means for separating the polymer containing catalyst and the normal pentane. The pressure drop across valve 23 is dependent upon the pressure in the conduit on the upstream and downstream sides of valve 23. As previously discussed, the pressure on the upstream side of valve 23 is dependent upon the relative volume of the conduit portions between valves 19 and 21 and valves 21 and 23. The pressure on the downstream side of valve 23 is dependent upon the back pressure maintained on this valve and in the practice of the described process is generally about atmospheric. The above-described sequence of events constitutes a complete cycle of operation of valves 19, 21 and 23. Thereafter, valve 19 is moved to an open position with valves 21 and 23 being in their closed position to commence the beginning of the cycle of operation.

As previously mentioned, the instant invention provides for a controlled pressure reduction while still allowing a desired pressure to be maintained within the pressurized reaction vessel. It has also been found that utilization of a plurality of valves, e.g., at least three valves, substantially eliminates the problem of valve erosion. This is due primarily to the fact that the valves are not subjected to extended periods of operation during which the full pressure drop is taken across each valve as is the case when a single valve is used. Furthermore, the use of a plurality of valves makes it possible to employ full opening valves rather than throttling valves while still obtaining the desired pressure let down. As a result, flow through the valves is unrestricted which reduces excessive wear of valve parts as well as prevents flashing through the valves. By utilizing additional valves, e.g., four or five valves, it is possible to adjust or vary the pressure drops across the valves and thereby control the speed or rate of the pressure let down across the valves. In other words, the greater the number of valves the more gradual is the pressure reduction across the valves. It is also within the scope of the invention to employ two valves although all of the benefits derived when using three or more valves are not obtained because the full pressure drop must be taken across each of the two valves in turn. However, the employment of two valves does make possible the utilization of full opening valves and permits a pressure let down while still maintaining a desired reactor pressure.

An important aspect of the instant invention is concerned with controlling the rate at which reactant materials are withdrawn from reactor 13. In a conventional system using a ported-type motor valve, such control can be accomplished merely by varying the opening through the valve. However, as mentioned above, such an expedient is entirely unsatisfactory when handling a slurry of solid materials in a liquid as described herein. In accordance with the instant invention, the speed of rotation of shaft 61 is adjusted so that the valves open and close at a rate such that a desired amount of reactant materials is permitted to flow through the valves. Adjustment of the speed of rotation of shaft 61 is accomplished by varying the pressure at which air is supplied to air turbine 64 through line 68. Plant air is supplied to the system at a constant pressure, e.g., 16 p.s.i.g.; however, the pressure at which the air actually enters the turbine is dependent upon the setting of motor valve 69. The setting of valve 69 is dependent upon one of the variables liquid level or pressure within reactor 13. Thus, referring especially to Figure 1, pressure recorder-controller 26 is initially given an index setting corresponding to the pressure which it is desired to maintain within the reactor. An air signal which is proportional to the actual pressure within reactor 13 is supplied to valve 69 by the recorder-controller. This air signal supplied to valve 69 adjusts the opening of the valve so as to vary the pressure drop taken by the air in passing through the valve. In this manner, the pressure at which air is supplied to the air turbine, and concomitantly the speed of rotation of shafts 66 and 61, are adjusted in accordance with the pressure within reactor 13. Furthermore, adjustment of the speed of rotation of the shafts varies the rate at which reactant material is removed from the reactor so as to maintain a desired pressure therein. For example, if the pressure within reactor 13 is above the pressure setting given to pressure recorder-controller 26, the air signal supplied to valve 69 is such as to cause the valve to be opened and thereby reduce the pressure drop across the valve. As a result, the speed of rotation of shafts 66 and 61 is increased, thereby increasing the speed at which valves 19, 21 and 23 are opened and closed. This permits a greater amount of reactant material to be removed from the reactor, which causes the pressure therein to be reduced. When the pressure within the reactor corresponds to the pressure setting given the pressure recorder-controller, the air signal supplied to valve 69 is now such that the valve causes air to be supplied to the turbine at a pressure which causes shafts 66 and 61 to rotate and the valves to open and close at a rate such that reactant materials are withdrawn at the rate required to maintain the desired pressure therein. When the pressure within reactor 13 decreases below the pressure setting given pressure recorder-controller 26, the converse of the above described sequence of events occurs so as to cut back on the rate at which reactant material is withdrawn from the reactor. It is also within the scope of the invention to control the rate at which material is withdrawn from the reactor in accordance with a liquid level to be maintained in the reactor. As shown in Figures 3 and 2, liquid level controller 27 is operatively connected to reactor 13 and to valve 69. This instrument produces an air signal which is proportional to the liquid level within the reactor, and this signal is then supplied to valve 69 so as to control the speed of rotation of shafts 66 and 61 and concomitantly the rate at which valves 19, 21 and 23 are opened and closed. Accordingly, if the liquid level within reactor 13 is higher than that desired, controller 27 furnishes a signal to valve 69 which causes this valve to open, thereby decreasing the pressure drop of the air flow through the valve. This in turn results in the speed of rotation of the shaft being increased so that the rate at which the valves are opened and closed is also increased. In this manner the rate at which reactant materials are withdrawn from the reactor is increased until such time as the liquid level in the reactor returns to the desired level. When the liquid level within reactor 13 falls below the desired level, the converse of the above-described sequence of events occurs so as to cut back on the rate of withdrawal of reactant materials.

After flowing through valve 23, the reactor effluent is passed to means for separating the polymer containing catalyst and the normal pentane. This separation can be accomplished by any suitable means, such as a filter, settling tank, or other means for accomplishing the separation of a liquid from solids. As shown in Figure 1, the reactant materials comprising polymer, normal pentane and unreacted ethylene are introduced initially into flash tank 71, which is provided with a suitable stirring means 72 operated by motor 73. The unreacted gas is taken overhead from flash tank 71 through line 74 and then passed into separator 76. The stream taken overhead through line 74 may contain a small amount of normal pentane. Therefore, prior to passing the stream into separator 76, it is cooled in cooler 77 in order to ensure that the normal pentane is in liquid form. Ethylene which is taken overhead from separator 76 through line 78 can be recycled, if desired, to line 14 for use in reactor 13. Normal pentane, which is recovered from separator 76 through line 79, can also be recycled to line 10 for ultimate use in reactor 13. The pressure maintained within flash tank 71 is controlled by means of pressure controller 81 which is operatively connected to the flash tank and to motor valve 82 positioned in line 74. This pressure is ordinarily about atmospheric; however, higher pressures can be used if desired. It is noted also that the pressure maintained through the operation of pressure controller 81 corresponds to the back pressure on valve 23 in line 18. Accordingly, the pressure setting given to pressure controller 81 is a factor in determining the pressure drop which will be taken across valves 19, 21 and 23. Line 83 connected to flash tank 71 provides means for introducing additional normal pentane into the system and thereby control the concentration of polymer in the hydrocarbon diluent.

A slurry of polymer containing catalyst in normal pentane is removed from the bottom of the flash tank through line 86 and then passed into solvent removal tank 87. The slurry is removed from the flash tank at a rate such as to maintain a desired level therein. This is accomplished through the operation of liquid level controller 88 which is operatively connected to the flash tank and to a flow control means, such as motor valve 89, in line 86. It is also within the scope of the invention to use instead of valve 89 a series of valves and a sequence controller as described hereinbefore. It is advantageous to use such a plurality of valves in accordance with this invention when the pressure maintained in flash tank 71 is substantially above atmospheric.

Steam is introduced into the lower portion of solvent removal tank 87 through line 91. Prior to its introduction into the tank, the steam is passed through filter 92 in order to remove any solid material. The rate at which steam is supplied to tank 87 is controlled by means of temperature controller 93 which is operatively connected to the tank and to a flow control means, such as motor valve 94, positioned in line 91. Through the operation of temperature controller 93 and valve 94, steam is supplied to tank 87 at a rate such as to maintain a desired temperature therein. Tank 87 is provided with a suitable stirring means 96, which is operated by motor 97. The steam strips the normal pentane from the materials in tank 87, the normal pentane then being taken overhead through line 98. Since the overhead stream may include some water, it is passed through condenser 99 prior to introduction into separator 101. In separator 101, normal pentane is recovered through line 102 while water is withdrawn through line 100. The normal pentane so recovered can, if desired, be recycled to line 10 for use in reactor 13. Line 103 connected to the top of the separator is provided for the removal of any gases which may not have been condensed in condenser 99.

A stream comprising primarily a slurry of polymer containing catalyst in water is withdrawn from the bottom of solvent removal tank 87 through line 104. The rate at which this material is removed from tank 87 may be controlled by means of motor valve 106 contained in line 104. This valve is operatively connected to a time cycle controller 107 in order that the material can be withdrawn from tank 87 at desired intervals. The slurry of polymer containing catalyst in water is passed by means of line 104 into skim tank 108, provided with paddles 109 which are rotated by means of motor 111. Rotation of paddles 109 causes the polymer to be skimmed from the top of the water contained in the skim tank, the polymer then falling into polymer tank 112. Water, which is removed from skim tank 108 through line 113, is then pumped by means of pump 114 to tank 87.

The polymer recovered in tank 112 can then be dried in a suitable drier and finally passed to suitable facilities for storage or directly to processing equipment. The polymer recovered in the described process in most instances will not require further treatment to remove the catalyst therefrom. However, it is to be understood that the polymer, if desired, may be further treated so as to remove the catalyst therefrom. The catalyst can be separated by dissolving the polymer in any suitable solvent by heating the solvent and polymer to a temperature such that the polymer is soluble therein. The catalyst can then be separated from the polymer solution by any convenient method, such as filtration, centrifugation, or settling.

In separating the polymer containing catalyst from the normal pentane, flash tank 71 can, if desired, be bypassed and the reactant materials introduced directly into the solvent removal tank as shown in Figure 3. Thus, line 116 connected to line 18 provides means for introducing the reactant materials directly into tank 87. When operating in this manner, unreacted ethylene is also included in the overhead taken from tank 87 through line 98. The ethylene, which is subsequently removed from separator 101 through line 103, can be recycled to line 14 for use in reactor 13.

The polymers produced in accordance with the above-described process have utility in applications where solid plastics are used. They can be molded to form a variety of articles of any desired shape, such as bottles and other containers for liquids. Also, they can be formed into pipe or tubing by extrusion.

A more complete understanding of the invention may be obtained by referring to the following illustrative example, which is not intended, however to be duly limitative of the invention.

*Example*

Apparatus similar to that illustrated in Figures 1 and 2 of the drawing is used to polymerize ethylene. The reactor which has a capacity of 1400 milliliters is jacketed and provided with a mechanical stirrer. The valves used in the product outlet line are ball-type valves manufactured by the Jamesbury Corp. of Worcester, Mass. The air switches are cam operated, four-way valves, Model 2310, as supplied by Rivett Lathe & Grinder, Inc., Boston, Massachusetts while the air cylinders are Model III air cylinders supplied by this same company. The air turbine is a Gast rotary air motor as supplied by the Gast Manufacturing Corporation, Benton Harbor, Michigan.

The catalyst used is prepared by the impregnation of a 50 to 70 mesh, silica-alumina coprecipitated composite with an 0.76 molar chromium trioxide solution. The silica-alumina composite comprises 90 weight percent silica and 10 weight percent alumina. The resulting composite is dried and activated with dry air for five hours at 950° F. The final catalyst contains 2.0 weight percent chromium oxide, calculated as chromium.

The polymerization is carried out at a temperature of about 220° F., using normal pentane as the solvent. The concentration of catalyst in the reactor is about 0.055 weight percent, based on normal pentane. Ethylene charged to the reactor is reacted at the rate of 480 pounds of ethylene per pound of catalyst per hour. The pressure recorder-controller is given an index setting of 500 p.s.i.g. This instrument controls the operation of the sequence controller in such a manner that the valves in the product outlet line are opened and closed at a rate such that reactant materials are withdrawn from the reactor at the rate required to maintain a reactor pressure of about 500 p.s.i.g. The pressure drop across the first valve when it is initially opened is 500 pounds. Upon closing of the first valve, the pressure is let down to about 250 pounds because of the increase in volume resulting from the simultaneous opening of the second valve. The back pressure maintained on the third valve is approximately 25 p.s.i.g. Accordingly, when the third valve is opened so as to allow the reactant materials to pass to the separation means, the pressure drop across the valve is approximately 225 pounds. The reactant materials after passing through the valves are introduced into a flash tank wherein unreacted ethylene is separated. Thereafter, the reactant materials free of ethylene are passed into a steam stripper from which normal pentane is taken overhead. A stream comprising a slurry of polymer containing catalyst and water is then passed into a skim tank which accomplishes the separation of the polymer from the water. The polymer which is recovered from the skim tank is then dried and subsequently passed to storage facilities.

From the foregoing, it is seen that an improved means is provided whereby a slurry of solids in a liquid material can be efficiently removed at a controlled rate from a pressurized vessel. Furthermore, because of the particular arrangement of flow control means as described, the problem of valve erosion which is a disadvantage of conventional systems utilizing a single valve is not present in the apparatus of this invention. It will be apparent to those skilled in the art that variations and modifications can be made from the foregoing disclosure. Such variations and modifications are believed to be clearly within the spirit and scope of the invention.

I claim:

1. In apparatus comprising a pressure vessel having inlet and outlet conduit means attached thereto, the improvement which comprises at least a first, second, and third full opening valve means positioned in series in said outlet conduit means; first control means attached to each of said valve means for sequentially opening and closing said latter means, said first control means being adapted to initially open said first valve means while maintaining said second and third valve means in a closed position, to next open said second valve means while closing said first valve means and maintaining said third valve means in a closed position, and to finally open said third valve means while maintaining said first and second valve means in closed positions to complete the cycle; and second control means connected to said first control means for controlling the rate at which said valve means are opened and closed.

2. The apparatus of claim 1 in which said second control means is a pressure controller which is operatively connected to said pressure vessel and to said first control means.

3. The apparatus of claim 1 in which said second control means is a liquid level controller which is operatively connected to said pressure vessel and to said first control means.

4. In apparatus comprising a pressure vessel having inlet and outlet conduit means attached thereto, the improvement which comprises first, second, and third full opening valve means positioned in series in said outlet conduit means; first, second, and third hydraulic cylinders; a first piston rod connected to a piston in said first hydraulic cylinder; a second piston rod connected to a piston in said second hydraulic cylinder; a third piston rod connected to a piston in said third hydraulic cylinder; a first, second, and third mechanical linkage connected, respectively, between said first, second, and third valve means and said first, second, and third piston rods, said mechanical linkages being adapted to open said valve means when said piston rods are in an extended position and to close said valve means when said piston rods are in a retracted position; first, second, and third four-way valves; a first line connected between a first outlet port of each of said four-way valves and a lower portion of each of said hydraulic cylinders; a second line connected between a second outlet port of each of said four-way valves and an upper portion of each of said hydraulic cylinders; a third line attached to a third outlet port of each of said four-way valves and open to the atmosphere at the other end; an inlet fluid line connected to an inlet port of each of said four-way valves; a spring operated plunger associated with each of said four-way valves and biased in an extended position, each said plunger when in an extended position being adapted to connect said fluid inlet port with said first outlet port and said second outlet port with said third outlet port and when in a retracted position being adapted to connect said fluid inlet port with said second outlet port and said first outlet port with said third outlet port of each said four-way valve; a rotatable shaft positioned above said four-way valves; first, second, and third cam members mounted on said shaft so that each of said cam members is in position to contact and thereby depress the plunger of one of said four-way valves to a retracted position; and means for rotating said shaft, said cam members being oriented on said shaft so that when one of said full opening valve means is open, the adjacent full opening valve means is closed.

5. The apparatus of claim 4 in which said first cam member is out of contact with its associated plunger when said second and third cam members are in contact with their associated plungers; said first and third cam members are in contact with their associated plunger when said second cam member is out of contact with its associated plunger; and said first and second cam members are in contact with their associated plunger when said third cam member is out of contact with its associated plunger.

6. The apparatus of claim 5 in which said means for rotating said shaft is an air turbine having an air inlet conduit means attached thereto; a flow control means is positioned in said air inlet conduit means; and a control means is operatively connected to said flow control means.

7. The apparatus of claim 6 in which said control means is a pressure controller, which is operatively connected to said flow control means and to said pressure vessel.

8. The apparatus of claim 6 in which said control means is a liquid level controller which is operatively connected to said flow control means and to said pressure vessel.

9. In apparatus comprising a pressure vessel having inlet and outlet conduit means attached thereto, the improvement which comprises a first valve connected at its inlet to the end of said outlet conduit; a first length of conduit connected at one end to the outlet of said first valve; a second valve connected at its inlet to the other end of said first length of conduit; a second length of conduit connected at one end to the outlet of said second valve; a third valve connected at its inlet to the other end of said second length of conduit; a discharge conduit connected to the outlet of said third valve; first control means attached to each of said valves for cyclically opening and closing them, said first control means being adapted to open said first valve when said second valve is closed, to open said second valve when said first and third valves are closed and to open said third valve when said second valve is closed; and second control means connected to said first control means for controlling the rate at which said valves are opened and closed.

10. The apparatus of claim 9 wherein said first and second lengths of conduit are approximately equal in length and internal diameter.

11. In a process which is carried out in a closed reaction zone under a first elevated pressure, the improvement in withdrawing a slurry of solids in a liquid from said reaction zone and passing said slurry to a discharge zone at a substantially reduced exhaust pressure which comprises communicating a first closed zone with said reaction zone, the initial pressure in said first closed zone being intermediate said elevated and exhaust pressures, thereby admitting slurry to said first closed zone and raising the pressure therein to said elevated pressure; terrminating communication between said first closed zone and said reaction zone; thereafter communicating a second closed zone with said first closed zone, the initial pressure in said second closed zone being said exhaust pressure, thereby admitting slurry from said first closed zone to said second closed zone and raising the pressure therein to said intermediate pressure while lowering the pressure in said first closed zone to said intermediate pressure; terminating communication between said first closed zone and said second closed zone; thereafter communicating said second closed zone with said discharge zone, thereby passing slurry to said discharge zone and lowering the pressure in said second closed zone to said exhaust pressure; and terminating communication between said second closed zone and said discharge zone, said communicating and terminating steps being performed in a cyclic, timed operation in response to a process variable in said reaction zone.

12. The process of claim 11 wherein the rate at which said slurry is passed into and withdrawn from said first and second closed zones is controlled in accordance with the pressure maintained in said reaction zone.

13. The process of claim 11 wherein the rate at which said slurry is passed into and withdrawn from said first and second closed zones is controlled in accordance with the liquid level maintained in said reaction zone.

14. In apparatus comprising a pressure vessel having inlet and outlet conduit means attached thereto, the improvement which comprises at least two full opening valve means positioned in series in said outlet conduit means; a cylinder carrying a fluid driven piston and piston rod connected to each of said valve means through a mechanical linkage, whereby each of said valve means is opened or closed by the movement of its associated piston rod and piston in its respective cylinder; a four-way valve connected to each cylinder through a pair of fluid lines which enter the cylinder in opposite ends thereof; a fluid supply line and a fluid vent line connectable alternatively through said four-way valve to each of said fluid lines, whereby fluid is supplied to one end of said cylinder on one side of said piston and simultaneously vented from the other end of said cylinder on the other side of said piston; a cam-operated plunger in each four-way valve adapted to determine the setting of said four-way valve; an air turbine, a rotatable shaft connected through a gear box to said air turbine and carrying a plurality of cam members operatively positioned with respect to each plunger to sequentially operate same, and an air line connected to said turbine, said air line carrying a motor valve controllable in response to a process variable in said pressure vessel.

References Cited in the file of this patent

UNITED STATES PATENTS

| | | |
|---|---|---|
| 1,970,871 | Tate | Aug. 21, 1934 |
| 2,020,847 | Mitereff | Nov. 12, 1935 |
| 2,263,055 | Smith | Nov. 18, 1941 |